US007776482B2

(12) United States Patent
Akiyama et al.

(10) Patent No.: US 7,776,482 B2
(45) Date of Patent: Aug. 17, 2010

(54) DYNAMICALLY CONTROLLABLE DIRECT OXIDATION FUEL CELL SYSTEMS AND METHODS THEREFOR

(75) Inventors: Takashi Akiyama, Osaka (JP); Chao-Yang Wang, State College, PA (US)

(73) Assignees: Panasonic Corporation, Osaka (JP); Penn State Research Foundation, University Park, PA (US)

( * ) Notice: Subject to any disclaimer, the term of this patent is extended or adjusted under 35 U.S.C. 154(b) by 1116 days.

(21) Appl. No.: 11/242,910

(22) Filed: Oct. 5, 2005

(65) Prior Publication Data
US 2007/0077466 A1    Apr. 5, 2007

(51) Int. Cl.
*H01M 2/00* (2006.01)
(52) U.S. Cl. ........................ 429/444; 429/515
(58) Field of Classification Search ............. 429/22, 429/23, 34
See application file for complete search history.

(56) References Cited

U.S. PATENT DOCUMENTS

| | | | |
|---|---|---|---|
| 5,539,643 A * | 7/1996 | Yamamoto et al. ............ 701/85 |
| 5,599,638 A | 2/1997 | Surampudi et al. |
| 6,461,751 B1 * | 10/2002 | Boehm et al. ................. 429/13 |
| 6,821,658 B2 | 11/2004 | Acker et al. |
| 2004/0062964 A1 * | 4/2004 | Matsuoka et al. ............. 429/26 |
| 2004/0081869 A1 * | 4/2004 | Morishima et al. ........... 429/23 |
| 2004/0209136 A1 | 10/2004 | Ren et al. |
| 2004/0209154 A1 | 10/2004 | Ren et al. |
| 2004/0247963 A1 * | 12/2004 | Akiyama et al. .............. 429/22 |
| 2005/0040786 A1 | 2/2005 | Ichinose et al. |
| 2005/0208352 A1 | 9/2005 | Sato et al. |
| 2006/0019143 A1 * | 1/2006 | Muramatsu et al. ........... 429/34 |

(Continued)

FOREIGN PATENT DOCUMENTS

WO    WO 2004/093231 A2    10/2004

(Continued)

OTHER PUBLICATIONS

International Preliminary Report on Patentability and Written Opinion of The International Searching Authority issued in International Application No. PCT/US2006/033532, dated Apr. 17, 2008.

(Continued)

*Primary Examiner*—Patrick Ryan
*Assistant Examiner*—Muhammad Siddiquee
(74) *Attorney, Agent, or Firm*—McDermott Will & Emery LLP

(57) ABSTRACT

A direct oxidation fuel cell (DOFC) system comprises at least one fuel cell assembly including a cathode and an anode with an electrolyte positioned therebetween; a source of liquid fuel in fluid communication with an anode inlet; an oxidant supply in fluid communication with a cathode inlet; a liquid/gas (L/G) separator in fluid communication with anode and cathode outlets for: (1) receiving unreacted fuel and liquid and gaseous products of electrochemical reactions at the cathode and anode, and (2) supplying the unreacted fuel and liquid product to the inlet of said anode; and a control and/or regulation system for determining a fuel efficiency value of the DOFC system during operation and determining and regulating and/or controlling oxidant stoichiometry of the DOFC system at an appropriate value in response to the determined fuel efficiency value.

11 Claims, 2 Drawing Sheets

U.S. PATENT DOCUMENTS

2006/0141338 A1 * 6/2006 Wang et al. .................. 429/44

FOREIGN PATENT DOCUMENTS

WO    WO 2006/071325      7/2006

OTHER PUBLICATIONS

Pasaogullari & Wang, "Liquid Water Transport in Gas Diffusion Layer of Polymer Electrolyte Fuel Cells", *J. Electrochem. Soc.*, pp. A399-A406, Mar. 2004.

Lim & Wang, "Development of High-Power Electrodes for a Liquid-Feed Direct Methanol Fuel Cell", Journal of Power Sources 113(2003) 145-150.

* cited by examiner

DYNAMICALLY CONTROLLABLE DIRECT OXIDATION FUEL CELL SYSTEMS AND METHODS THEREFOR

FIELD OF THE DISCLOSURE

The present disclosure relates generally to fuel cells, fuel cell systems, and methods of operating same. More specifically, the present disclosure relates to direct oxidation fuel cells (DOFC's), such as direct methanol fuel cells (DMFC's), and their systems and operating methods.

BACKGROUND OF THE DISCLOSURE

A direct oxidation fuel cell (DOFC) is an electrochemical device that generates electricity from electrochemical oxidation of a liquid fuel. DOFC's do not require a preliminary fuel processing stage; hence, they offer considerable weight and space advantages over indirect fuel cells, i.e., cells requiring preliminary fuel processing. Liquid fuels of interest for use in DOFC's include methanol ($CH_3OH$), formic acid, dimethyl ether (DME), etc., and their aqueous solutions. The oxidant may be substantially pure oxygen ($O_2$) or a dilute stream of oxygen, such as that in air. Significant advantages of employing a DOFC in portable and mobile applications (e.g., notebook computers, mobile phones, PDA's, etc.) include easy storage/handling and high energy density of the liquid fuel.

One example of a DOFC system is a direct methanol fuel cell (DMFC). A DMFC generally employs a membrane-electrode assembly (hereinafter "MEA") having an anode, a cathode, and a proton-conducting membrane electrolyte positioned therebetween. A typical example of a membrane electrolyte is one composed of a perfluorosulfonic acid-tetrafluoroethylene copolymer, such as Nafion® (Nafion® is a registered trademark of E.I. Dupont de Nemours and Company). In a DMFC, a methanol/water solution is directly supplied to the anode as the fuel and air is supplied to the cathode as the oxidant. At the anode, the methanol ($CH_3OH$) reacts with the water ($H_2O$) in the presence of a catalyst, typically a Pt or Ru metal-based catalyst, to produce carbon dioxide ($CO_2$), protons ($H^+$ ions), and electrons ($e^-$). The electrochemical reaction is shown as equation (1) below:

$$CH_3OH + H_2O \rightarrow CO_2 + 6H^+ + 6e^- \quad (1)$$

During operation of the DMFC, the protons migrate to the cathode through the proton-conducting membrane electrolyte, which is non-conductive to electrons. The electrons travel to the cathode through an external circuit for delivery of electrical power to a load device. At the cathode, the protons, electrons, and oxygen ($O_2$) molecules, typically derived from air, are combined to form water. The electrochemical reaction is given in equation (2) below:

$$3/2 O_2 + 6H^+ + 6e^- \rightarrow 3H_2O \quad (2)$$

Electrochemical reactions (1) and (2) form an overall cell reaction as shown in equation (3) below:

$$CH_3OH + 3/2 O_2 \rightarrow CO_2 + 2H_2O \quad (3)$$

One drawback of a conventional DMFC is that the methanol partly permeates the membrane electrolyte from the anode to the cathode, such permeated methanol being termed "crossover methanol". The crossover methanol chemically (i.e., not electrochemically) reacts with oxygen at the cathode, causing a reduction in fuel utilization efficiency and cathode potential, with a corresponding reduction in power generation of the fuel cell. It is thus conventional for DMFC systems to use excessively dilute (3-6% by vol.) methanol solutions for the anode reaction in order to limit methanol crossover and its detrimental consequences. However, the problem with such a DMFC system is that it requires a significant amount of water to be carried in a portable system, thus diminishing the system energy density.

The ability to use highly concentrated fuel is desirable for portable power sources, particularly since DMFC technology is currently competing with advanced batteries, such as those based upon lithium-ion technology. However, even if the fuel cartridge with highly concentrated fuel (e.g., pure or "neat" methanol) carries little to no water, the anodic reaction, i.e., equation (1), still requires one water molecule for each methanol molecule for complete electro-oxidation. Simultaneously, water is produced at the cathode via reduction of oxygen, i.e., equation (2). Therefore, in order to take full advantage of a fuel cell employing highly concentrated fuel, it would be desirable to: (a) maintain a net water balance in the cell where the total water loss from the cell (mainly through the cathode) preferably does not exceed the net production of water (i.e., two water molecules per each methanol molecule consumed according to equation (3)), and (b) transport some of the produced water from the cathode to anode.

Two approaches have been developed to meet the above-mentioned goals in order to directly use concentrated fuel. A first approach is an active water condensing and pumping system to recover cathode water vapor and return it to the anode (U.S. Pat. No. 5,599,638). While this method achieves the goal of carrying concentrated (and even neat) methanol in the fuel cartridge, it suffers from a significant increase in system volume and parasitic power loss due to the need for a bulky condenser and its cooling/pumping accessories.

The second approach is a passive water return technique in which hydraulic pressure at the cathode is generated by including a highly hydrophobic microporous layer (MPL) in the cathode, and this pressure is utilized for driving water from the cathode to the anode through a thin membrane (Ren et al. and Pasaogullari & Wang, *J. Electrochem. Soc.*, pp A399-A406, March 2004). While this passive approach is efficient and does not incur parasitic power loss, the amount of water returned, and hence the concentration of methanol fuel, depends strongly on the cell temperature and power density. Presently, direct use of neat methanol is demonstrated only at or below 40° C. and at low power density (less than 30 $mW/cm^2$). Considerably less concentrated methanol fuel is utilized in high power density (e.g., 60 $mW/cm^2$) systems at elevated temperatures, such as 60° C. In addition, the requirement for thin membranes in this method sacrifices fuel efficiency and operating cell voltage, thus resulting in lower total energy efficiency.

Thus, there is a prevailing need for DOFC/DMFC systems that maintain a balance of water in the fuel cell and return a sufficient amount of water from the cathode to the anode under high-power and elevated temperature operating conditions. There is an additional need for DOFC/DMFC systems that operate with highly concentrated fuel, including neat methanol, and minimize the need for external water supplies or condensation of electrochemically produced water.

A further need exists for DOFC/DMFC systems and operating methods therefor which facilitate operation under various and dynamically changing conditions and scenarios, e.g., as where variable control of the operating (output) current, hence fuel conversion efficiency, is required for matching with dynamically changing requirements of the electrical load.

In view of the foregoing, there exists a need for improved DOFC/DMFC systems and methodologies which facilitate variable (i.e., dynamic) control of the operating parameters of such systems for obtaining optimal performance with very highly concentrated fuel and high energy conversion efficiency.

SUMMARY OF THE DISCLOSURE

An advantage of the present disclosure is improved direct oxidation fuel cell (DOFC) systems including a dynamic control and/or regulation system.

Another advantage of the present disclosure is improved, dynamically controllable DOFC systems that operate efficiently on highly concentrated fuel with high energy conversion efficiency.

A further advantage of the present disclosure is improved methods for dynamically controlling and/or regulating the operation of DOFC systems utilizing highly concentrated fuel at high energy conversion efficiency.

Additional advantages and other features of the present disclosure will be set forth in the description which follows and in part will become apparent to those having ordinary skill in the art upon examination of the following or may be learned from the practice of the present disclosure. The advantages may be realized and obtained as particularly pointed out in the appended claims.

According to an aspect of the present disclosure, the foregoing and other advantages are achieved in part by an improved DOFC system, comprising:

(a) at least one fuel cell assembly including a cathode and an anode with an electrolyte positioned therebetween, the at least one fuel cell assembly adapted for performing selected electrochemical reactions at the anode and cathode;

(b) a source of liquid fuel in fluid communication with an inlet of the anode;

(c) an oxidant supply in fluid communication with an inlet of the cathode;

(d) a liquid/gas (L/G) separator in fluid communication with outlets of each of the anode and cathode for: (1) receiving unreacted fuel and liquid and gaseous products of the selected electrochemical reactions, and (2) supplying the unreacted fuel and liquid product to the inlet of the anode; and (e) a control system adapted for determining a fuel efficiency value of the DOFC system during operation and for determining and regulating/controlling oxidant stoichiometry of the DOFC system at an appropriate value in response to the determined fuel efficiency value.

In accordance with embodiments of the present disclosure, the control system is adapted for periodically or continuously determining the fuel efficiency value and utilizing same for periodically or continuously determining and controlling the oxidant stoichiometry value; the control system comprises a sensor for measuring an output current of the DOFC system; and an electronic control unit (ECU) for: (1) determining the fuel efficiency value based upon the measured output current; and (2) utilizing the fuel efficiency value for determining the appropriate oxidant stoichiometry value; and the control system is further adapted for utilizing the appropriate oxidant stoichiometric value for controlling a rate of supply of the oxidant to the cathode of the at least one fuel cell assembly.

According to preferred embodiments of the present disclosure, the ECU comprises a programmed computer adapted for: (1) indirectly determining a current density equivalent of a liquid fuel crossover rate of the fuel cell assembly, utilizing a stored data table correlating the current density equivalent of the liquid fuel crossover rate of the fuel cell assembly with output current density of the fuel cell assembly; and (2) utilizing said indirectly determined current density equivalent of the liquid fuel crossover rate and the measured current output for determining the fuel efficiency value; whereas, according to other preferred embodiments, the ECU comprises a programmed computer adapted for: (1) indirectly determining a current density equivalent of a liquid fuel crossover rate of the fuel cell assembly, utilizing a stored mathematical relationship between the current density equivalent of the liquid fuel crossover rate of the fuel cell assembly and output current density of the fuel cell assembly; and (2) utilizing the indirectly determined current density equivalent of the liquid fuel crossover rate and the measured current output for determining the fuel efficiency value.

According to still other preferred embodiments of the present disclosure, the control/regulation system further comprises a gas sensor adapted for use in directly measuring a current density equivalent of a liquid fuel crossover rate of the fuel cell assembly; and the ECU comprises a programmed computer adapted for utilizing the directly measured current density equivalent of the liquid fuel crossover rate and the measured current output for determining the fuel efficiency value; wherein the gas sensor is positioned at the cathode outlet and is adapted for sensing an amount of an oxidation product of the liquid fuel or an amount of the oxidant present at the cathode outlet.

Further preferred embodiments of the present disclosure include those wherein the control system is further adapted for performing at least one of: (1) terminating operation of the at least one fuel assembly when the determined fuel efficiency value is below a predetermined minimum value; (2) checking for and diagnosing operating problems in the at least one fuel cell assembly; (3) providing a signal indicating the need for corrective action to increase the determined fuel efficiency value to at least a predetermined minimum value; and (4) taking corrective action to increase the determined current efficiency value to at least the predetermined minimum value.

Another aspect of the present disclosure is an improved method of operating a direct oxidation fuel cell (DOFC) system comprising at least one fuel cell assembly including a cathode and an anode with an electrolyte positioned therebetween, a source of liquid fuel in fluid communication with an inlet of the anode, an oxidant supply in fluid communication with an inlet of the cathode; and a liquid/gas (L/G) separator in fluid communication with outlets of the anode and cathode for: (1) receiving unreacted fuel and liquid and gaseous products of selected electrochemical reactions at the cathode and anode, and (2) supplying the unreacted fuel and liquid product to the anode inlet, comprising:

determining a fuel efficiency value of the DOFC system during operation and determining and controlling oxidant stoichiometry of the DOFC system at an appropriate value in response to the determined fuel efficiency value.

Embodiments of the present disclosure include those wherein the method comprises periodically or continuously determining the fuel efficiency value and utilizing same for periodically or continuously determining and controlling the oxidant stoichiometry value; utilizing a control/regulation system including a sensor for measuring an output current of the DOFC system and an electronic control unit (ECU) for: (1) determining the fuel efficiency value based upon the measured output current; and (2) utilizing the fuel efficiency value for determining the appropriate oxidant stoichiometry value; and utilizing the appropriate oxidant stoichiometric value for controlling a rate of supply of the oxidant to the cathode of the at least one fuel cell assembly.

According to preferred embodiments of the present disclosure, the method comprises utilizing as the ECU a programmed computer adapted for: (1) indirectly determining a current density equivalent of a liquid fuel crossover rate of the fuel cell assembly, utilizing a stored data table correlating the current density equivalent of the liquid fuel crossover rate of the fuel cell assembly with output current density of the fuel cell assembly; and (2) utilizing the indirectly determined current density equivalent of the liquid fuel crossover rate and the measured current output for determining the fuel efficiency value; whereas, according to other preferred embodiments, the method comprises utilizing as the ECU a programmed computer adapted for: (1) indirectly determining a current density equivalent of a liquid fuel crossover rate of the fuel cell assembly, utilizing a stored mathematical relationship between the current density equivalent of the liquid fuel crossover rate of the fuel cell assembly and output current density of the fuel assembly; and (2) utilizing the indirectly determined current density equivalent of the liquid fuel crossover rate and the measured current output for determining the fuel efficiency value.

Further preferred embodiments of the present disclosure include those wherein the method comprises utilizing a gas sensor adapted for use in directly measuring a current density equivalent of a liquid fuel crossover rate of the fuel cell assembly, and as the ECU a programmed computer adapted for utilizing the directly measured current density equivalent of the liquid fuel crossover rate and the measured current output for determining the fuel efficiency value.

According to these embodiments, the method comprises positioning the gas sensor at the outlet of the cathode, the gas sensor being adapted for sensing an amount of an oxidation product of the liquid fuel or an amount of the oxidant present at the outlet of the cathode.

Still further preferred embodiments of the present disclosure include those wherein the method further comprises utilizing the ECU for performing at least one of: (1) terminating operation of the at least one fuel assembly when the determined fuel efficiency value is below a predetermined minimum value; (2) checking for and diagnosing operating problems in the at least one fuel cell assembly; (3) providing a signal indicating the need for corrective action to increase the determined current efficiency value to at least a predetermined minimum value; and (4) taking corrective action to increase the determined current efficiency value to at least the predetermined minimum value.

Additional advantages of the present disclosure will become readily apparent to those skilled in this art from the following detailed description, wherein only the preferred embodiments of the present disclosure are shown and described, simply by way of illustration but not limitation. As will be realized, the disclosure is capable of other and different embodiments, and its several details are capable of modification in various obvious respects, all without departing from the spirit of the present invention. Accordingly, the drawings and description are to be regarded as illustrative in nature, and not as restrictive.

BRIEF DESCRIPTION OF THE DRAWINGS

The various features and advantages of the present disclosure will become more apparent and facilitated by reference to the accompanying drawings, provided for purposes of illustration only and not to limit the scope of the invention, wherein the same reference numerals are employed throughout for designating like features and the various features are not necessarily drawn to scale but rather are drawn as to best illustrate the pertinent features, wherein.

DETAILED DESCRIPTION OF THE DISCLOSURE

The present disclosure relates to high energy conversion efficiency, dynamically controllable, direct oxidation fuel cells (DOFC) and DOFC systems operating with highly concentrated fuel, e.g., direct methanol fuel cells (DMFC) and systems, and operating methods therefor.

Figure 1:
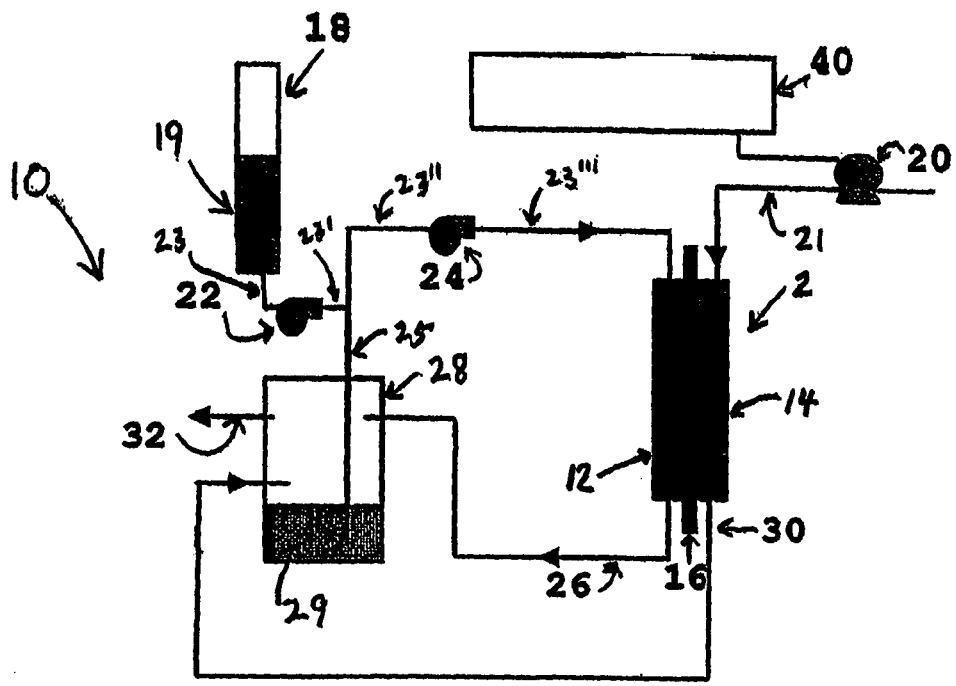
FIG. 1 is a simplified, schematic illustration of a direct oxidation fuel cell (DOFC) system capable of operating with highly concentrated methanol fuel, i.e., a DMFC system.

Referring to FIG. 1, schematically shown therein is an illustrative embodiment of a DOFC system adapted for operating with highly concentrated fuel, e.g., a methanol-based DMFC system 10, which system maintains a balance of water in the fuel cell and returns a sufficient amount of water from the cathode to the anode under high-power and elevated temperature operating conditions. (A DOFC/DMFC system is disclosed in co-pending, commonly assigned U.S. patent application Ser. No. 11/020,306, filed Dec. 27, 2004).

As shown in FIG. 1, DMFC system 10 includes an anode 12, a cathode 14, and a proton-conducting electrolyte membrane 16, forming a multi-layered composite membrane-electrode assembly or structure 2 commonly referred to as an MEA. Typically, a fuel cell system such as DMFC system 10 will have a plurality of such MEAs in the form of a stack; however, FIG. 1 shows only a single MEA for illustrative simplicity. Frequently, the membrane-electrode assemblies 2 are separated by bipolar plates that have serpentine channels for supplying and returning fuel and by-products to and from the assemblies (not shown for illustrative convenience). In a fuel cell stack, MEAs and bipolar plates are aligned in alternating layers to form a stack of cells and the ends of the stack are sandwiched with current collector plates and electrical insulation plates, and the entire unit is secured with fastening structures. Also not shown in FIG. 1, for illustrative simplicity, is a load circuit electrically connected to the anode 12 and cathode 14.

A source of fuel, e.g., a fuel container or cartridge 18 containing a highly concentrated fuel 19 (e.g., methanol), is in fluid communication with anode 12 (as explained below). An oxidant, e.g., air supplied by fan 20 and associated conduit 21, is in fluid communication with cathode 14. The highly concentrated fuel from fuel cartridge 18 is fed directly into liquid/gas separator 28 by pump 22 via associated conduit segments 23' and 25, or directly to anode 12 via pumps 22 and 24 and associated conduit segments 23, 23', 23', and 23'''.

In operation, highly concentrated fuel 19 is introduced to the anode side of the MEA 2, or in the case of a cell stack, to an inlet manifold of an anode separator of the stack. Water produced at the cathode 14 side of MEA 2 or cathode cell stack via electrochemical reaction (as expressed by equation (2)) is withdrawn therefrom via cathode exit port/conduit 30 and supplied to liquid/gas separator 28. Similarly, excess fuel, water, and $CO_2$ gas are withdrawn from the anode side of the MEA 2 or anode cell stack via anode exit port/conduit 26 and supplied to liquid/gas separator 28. The air or oxygen is introduced to the cathode side of the MEA 2 and regulated to maximize the amount of electrochemically produced water in liquid form while minimizing the amount of electrochemically produced water vapor, thereby minimizing the escape of water vapor from system 10.

As indicated, during operation air is introduced to the cathode 14 (as explained above) and excess air and liquid water are withdrawn therefrom via cathode exit port/conduit 30 and supplied to the liquid/gas ("L/G") separator 28. As discussed further below, the input air flow rate or air stoichiometry is controlled to maximize the amount of the liquid phase of the electrochemically produced water while minimizing the amount of the vapor phase of the electrochemically produced water. Control of the oxidant stoichiometry ratio can be obtained by setting the speed of fan 20 at a fixed rate depending on the fuel cell system operating conditions or by means of electronic control unit (ECU) 40, e.g., a digital computer-based controller. ECU 40 receives an input signal from a temperature sensor in contact with the liquid phase 29 of L/G separator 28 (not shown in the drawing for illustrative simplicity) and adjusts the oxidant stoichiometric ratio so as to maximize the liquid water phase in the cathode exhaust and minimize the water vapor phase in the exhaust, thereby minimizing the need for a water condenser to condense water vapor produced and exhausted from the cathode of the MEA 2. In addition, ECU 40 can increase the oxidant stoichiometry beyond the minimum setting during cold-start in order to avoid excessive water accumulation in the cell.

Liquid water 29 which accumulates in the L/G separator 28 during operation may be returned to anode 12 via circulating pump 24 and conduit segments 25, 23', and 23'". Exhaust carbon dioxide gas is released through port 32 of liquid/gas separator 28.

As indicated above, cathode exhaust water, i.e., water which is electrochemically produced at the cathode during operation, is partitioned into liquid and gas phases, and the relative amounts of water in each phase are controlled mainly by temperature and air flow rate. The amount of liquid water can be maximized and the amount of water vapor minimized by using a sufficiently small oxidant flow rate or oxidant stoichiometry. As a consequence, liquid water from the cathode exhaust can be automatically trapped within the system, i.e., an external condenser is not required, and the liquid water can be combined in sufficient quantity with a highly concentrated fuel, e.g., greater than about 5 molar (M), for use in performing the anodic electrochemical reaction, thereby maximizing the concentration of fuel and storage capacity and minimizing the overall size of the system. The water can be recovered in an existing type of anode liquid/gas separator 28, e.g., such as those typically used to separate $CO_2$ gas and aqueous methanol solution.

The DOFC system 10 shown in FIG. 1 comprises at least one MEA 2 which includes a polymer electrolyte membrane 16 and a pair of electrodes (an anode 12 and a cathode 14) each composed of a catalyst layer and a gas diffusion layer sandwiching the membrane. Typical polymer electrolyte materials include fluorinated polymers having perfluorosulfonate groups or hydrocarbon polymers such as poly-(arylene ether ether ketone) ("PEEK"). The electrolyte membrane can be of any suitable thickness as, for example, between about 25 and about 180 μm. The catalyst layer typically comprises platinum or ruthenium based metals, or alloys thereof. The anodes and cathodes are typically sandwiched by separator plates having channels to supply fuel to the anode and an oxidant to the cathode. A fuel cell can contain a plurality of such MEA's 2 with at least one electrically conductive separator placed between adjacent MEA's to electrically connect the MEAs in series with each other, and to provide mechanical support.

ECU 40 adjusts the oxidant flow rate or stoichiometric ratio so as to maximize the liquid water phase in the cathode exhaust and minimize the water vapor phase in the exhaust, thereby eliminating the need for a water condenser. ECU 40 adjusts the oxidant flow rate, hence stoichiometric ratio, according to a specific equation, illustratively equation (4) given below:

$$\xi_c = \frac{0.42(\gamma + 2)}{3\eta_{fuel}} \frac{p}{p_{sat}} \quad (4)$$

wherein $\xi_c$ is the oxidant stoichiometry, $\gamma$ is the ratio of water to fuel in the fuel supply, $p_{sat}$ is the water vapor saturation pressure corresponding to the cell temperature, p is the cathode operating pressure, and $\eta_{fuel}$ is the fuel efficiency. Such controlled oxidant stoichiometry automatically ensures an appropriate water balance in the DMFC (i.e. enough water for the anode reaction) under any operating conditions. For instance, during start-up of a DMFC system, when the cell temperature increases from e.g., 20° C. to the operating point of 60° C., the corresponding $p_{sat}$ is initially low, and hence a large oxidant stoichiometry (flow rate) should be used in order to avoid excessive water accumulation in the system and therefore cell flooding by liquid water. As the cell temperature increases, the oxidant stoichiometry (flow rate) decreases according to equation (4).

The fuel efficiency, $\eta_{fuel}$, of a DOFC system, illustratively a DMFC system, is customarily defined as the ratio of the fuel cell operating current density, I, to the sum of the operating current density I and the current density equivalent of the methanol crossover rate, $I_{xover}$, as expressed by equation (5) below:

$$\eta_{fuel} = \frac{I}{I + I_{xover}} \quad (5)$$

In the above analysis, the fuel efficiency $\eta_{fuel}$ has been considered as constant, i.e., when the DOFC/DMFC system is operated according to conditions consistent with its design, eq. (5) is valid. However, operating situations and scenarios frequently change over time, e.g., as when the load requirement changes, necessitating a corresponding change in the operating current density I, As a consequence, $\eta_{fuel}$ is subject to dynamic variation, e.g., from moment-to-moment or hour-to-hour, requiring corresponding change in oxidant stoichiometry, i.e., oxidant flow rate as determined by the system fan, e.g., fan 20 shown in FIG. 1.

Accordingly, optimum operation of DOFC/DMFC systems at high fuel efficiencies and high power output requires control and/or regulation systems and methodologies for determining and providing appropriate values of $\eta_{fuel}$ in a dynamically changing manner, along with recalculated values of oxidant stoichiometry $\xi_c$ and appropriate control of oxidant flow as provided by the system fan.

Figure 2:
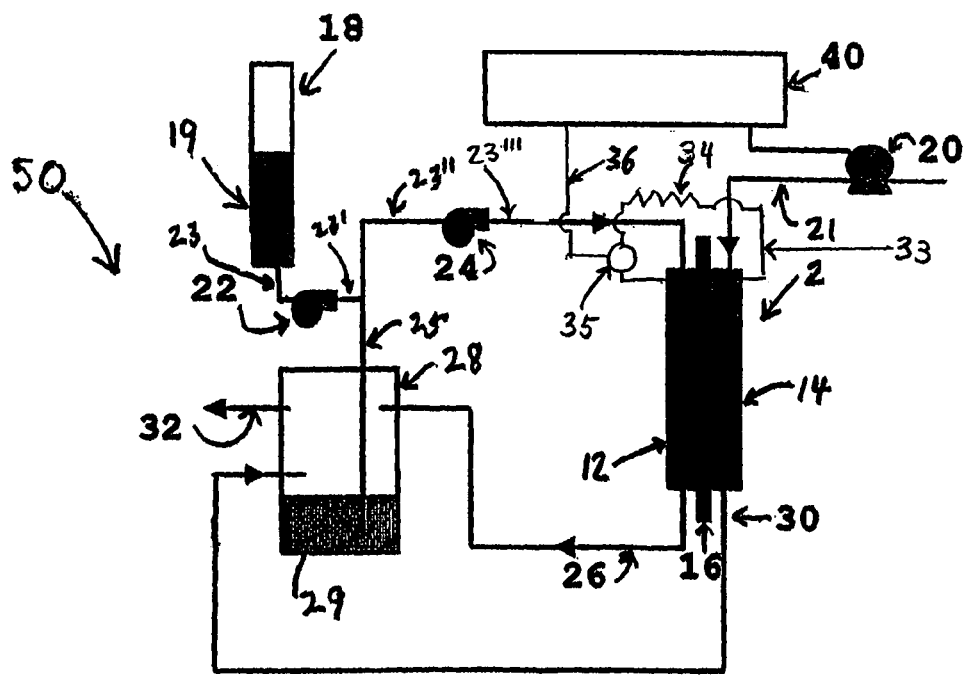
FIG. 2 is a simplified, schematic illustration of a DOFC/DMFC system according to embodiments of the present disclosure.

Referring to FIG. 2, shown therein is a simplified, schematic illustration of a dynamically controllable DOFC/DMFC system 50 according to embodiments of the present disclosure. As illustrated, system 50 is similar to system 10 of FIG. 1, and therefore only those components and features pertaining to the dynamic control aspect of system 50 are described in the following.

As illustrated, system 50 includes a current measuring device/sensor 35 operatively connected as a current input to ECU 40 for supplying the latter with a signal indicative of the output current of fuel cell assembly 2 flowing through output circuit 33 including electrical load 34. ECU 40 is typically comprised of a programmable electronic computer, and, according to one embodiment utilizing a current measuring device/sensor such as sensor 35 of FIG. 2, includes a stored data table correlating the current density equivalent of the liquid fuel crossover rate of fuel cell assembly 2 with its output current density. Such data table can be constructed, e.g., during design and development of the fuel cell assembly, by experimentally determining Ixover at a number of operating (i.e., output) currents.

During operation of system 50, ECU 40 indirectly determines the current density equivalent $I_{xover}$ of the liquid fuel crossover rate of the fuel cell assembly, utilizing the actual output current I (measured by sensor 35 and inputted to ECU 40 via line 36) and the stored data table correlating the current density equivalent of the liquid fuel crossover rate of the fuel cell assembly with output current density of the fuel assembly. ECU 40 then: (1) utilizes the indirectly determined current density equivalent of the liquid fuel crossover rate and the measured current output for determining the fuel efficiency value $\eta_{fuel}$ via equation (5); (2) calculates the appropriate oxidant stoichiometry $\xi_c$ for the determined fuel efficiency value $\eta_{fuel}$ according to equation (4); and (3) adjusts the speed of oxidant supply fan 20 (or like device) to provide the requisite oxidant stoichiometry $\xi_c$.

According to another embodiment of the present disclosure utilizing a current measuring device/sensor, such as sensor 35 of FIG. 2, for indirectly determining the current density equivalent $I_{xover}$ of the liquid fuel crossover rate of the fuel cell assembly, a mathematical relationship between the current density equivalent of the liquid fuel crossover rate and output current density of the fuel cell assembly is stored in ECU 40 for providing an indirectly determined current density equivalent of the liquid fuel crossover rate and the measured current output for determining the fuel efficiency value. According to this embodiment, $I_{xover}$ is experimentally determined at a number of output currents I during design and development of the fuel cell assembly 2, and a mathematical equation describing the relationship between $I_{xover}$ and I is developed therefrom. By way of illustration only, when the fuel flow rate is low, i.e., the fuel stoichiometry ratio is e.g., less than about 2, the variation of $I_{xover}$ is approximately linear with output current I, and the following mathematical relationship between $I_{xover}$ and I obtains, as expressed by equation (6) below:

$$I_{xover} = aI + b, \qquad (6)$$

where a and b are constants.

Combining equations (5) and (6) results in the following mathematical relationship between $\eta_{fuel}$ and measured output current I, as expressed in equation (7) below:

$$\eta_{fuel} = \frac{I}{(a+1)I + b} \qquad (7)$$

According to this embodiment, I is continuously variable and it is not necessary for I to coincide with a particular operational point utilized in forming the data table of the previous variant. ECU 40: (1) utilizes the indirectly determined current density equivalent of the liquid fuel crossover rate and the measured current output for determining the fuel efficiency value $\eta_{fuel}$ via equation (7); (2) calculates the appropriate oxidant stoichiometry $\xi_c$ for the determined fuel efficiency value $\eta_{fuel}$ according to equation (4); and (3) adjusts the speed of oxidant supply fan 20 (or like device) to provide the requisite oxidant stoichiometry $\xi_c$.

In either instance where $I_{xover}$ is indirectly determined, the dynamic control of oxidant stoichiometry in response to variation in fuel efficiency afforded by ECU 40 can be performed continuously or intermittently at predetermined intervals.

Figure 3:
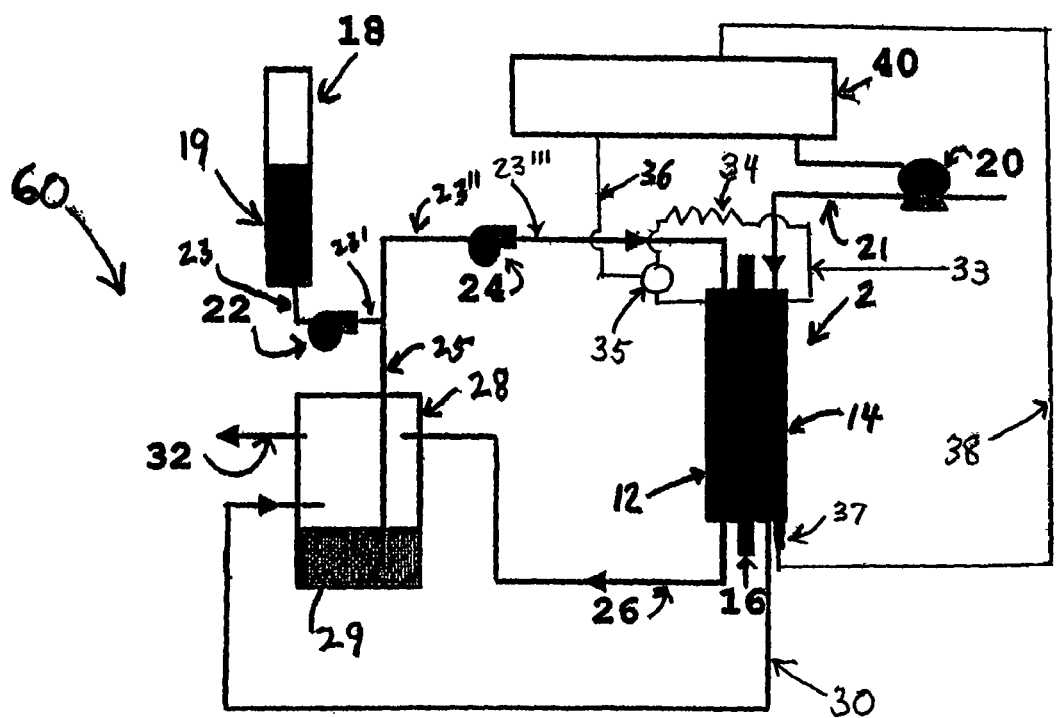
FIG. 3 is a simplified, schematic illustration of a DOFC/DMFC system according to other embodiments of the present disclosure.

Adverting to FIG. 3, shown therein is a simplified, schematic illustration of a DOFC/DMFC system 60 according to still other embodiments of the present disclosure, wherein system 50 of FIG. 2 is modified to include a gas sensor 37 operatively connected to the output/exhaust conduit 30 of cathode 14 of the fuel cell assembly 2, and the output of sensor 37 is inputted to ECU 40 via line 38. Such arrangement is useful for determining $I_{xover}$ in situations where system operation is irregular, e.g., as when there is an interruption in fuel feed or a degradation in the fuel cell polymer membrane 16 or electrodes 12 and 14, resulting in a possibly significant increase in $I_{xover}$. In such instances, it is necessary that the DOFC/DMFC system be provided with capability for obtaining a directly measured value (i.e., an actual value, as compared with an indirectly measured value) of $I_{xover}$ in order to maintain appropriate operating conditions.

According to one variant of system 60, sensor 37 is adapted for measuring the amount of gaseous oxidation product ($CO_2$) present in the cathode 14 exhaust. For example, in DMFC systems, methanol ($CH_3OH$) crossing over membrane 16 is oxidized to $CO_2$ at the cathode catalyst layer according to a chemical oxidation reaction identical to the overall electrochemical cell reaction expressed by equation (3) above, i.e., $$CH_3OH + 3/2 O_2 \rightarrow CO_2 + 2H_2O \qquad (3)$$

The amount of $CO_2$ present in the cathode exhaust is therefore proportional to the amount of crossover methanol, hence proportional to $I_{xover}$. In this instance, ECU 40: (1) utilizes the directly determined current density equivalent of the liquid fuel crossover rate and the measured current output for determining the fuel efficiency value $\eta_{fuel}$ via equation (5); (2) calculates the appropriate oxidant stoichiometry $\xi_c$ for the determined fuel efficiency value $\eta_{fuel}$ according to equation (4); and (3) adjusts the speed of oxidant supply fan 20 (or like device) to provide the requisite oxidant stoichiometry $\xi_c$.

According to another variant of system 60, sensor 37 is adapted for measuring the amount of oxidant ($O_2$) present in the cathode 14 exhaust. The amount of oxidant (e.g., $O_2$ concentration) in the cathode exhaust is reduced, compared to the $O_2$ concentration in the inlet air flow from fan 20, because of: (1) oxidation of crossover methanol according to the reaction expressed in equation (3) above; and electrochemical reduction of oxidant ($O_2$) according to reaction (2) above:

$$3/2 O_2 + 6H^+ + 6e^- \rightarrow 3H_2O \qquad (2)$$

Measurement of the oxidant ($O_2$) concentration at the cathode exhaust, along with measurement of the output current I, therefore affords measurement of $I_{xover}$. As before, ECU 40: (1) utilizes the directly determined current density equivalent of the liquid fuel crossover rate and the measured current output for determining the fuel efficiency value $\eta_{fuel}$ via equation (5); (2) calculates the appropriate oxidant stoichiometry $\xi_c$ for the determined fuel efficiency value $\eta_{fuel}$ according to equation (4); and (3) adjusts the speed of oxidant supply fan 20 (or like device) to provide the requisite oxidant stoichiometry $\xi_c$.

According to still further embodiments of the present disclosure, ECU 40 restricts or limits the output current I of the fuel cell assembly 2 to a certain range. Therefore, if for example, the system is operating at a low fuel efficiency value $\eta_{fuel}$, the system may not be useful, and the calculated value of $\eta_{fuel}$ falls below a predetermined value, e.g., about 50%, ECU 40 terminates operation of the fuel cell or system or reduces the fuel flow rate.

Generally, the ECU may be adapted for performing at least one of: (1) terminating operation of the at least one fuel assembly when the determined fuel efficiency value is below a predetermined minimum value, as just described; (2) checking for and diagnosing operating problems in the at least one fuel cell assembly; (3) providing a signal indicating the need for corrective action to increase the determined fuel efficiency value to at least a predetermined minimum value; and (4) taking corrective action to increase the determined current efficiency value to at least the predetermined minimum value.

In summary, the present disclosure offers a number of advantages to the operation of DOFC/DMFC fuel cells and systems, including:

(1) the system operating current can be variable rather than fixed, as by use of a calculation procedure utilizing a predetermined table of crossover and output current values or a mathematical equation relating same;

(2) accuracy of calculation of $\eta_{fuel}$ values is improved, and the oxidant (air) flow rates are set at more appropriate values for recovering water from the cathode exhaust; and (3) operation at low fuel efficiencies can be avoided.

In the previous description, numerous specific details are set forth, such as specific materials, structures, processes, etc., in order to provide a better understanding of the present disclosure. However, the present disclosure can be practiced without resorting to the details specifically set forth. In other instances, well-known processing materials and techniques have not been described in detail in order not to unnecessarily obscure the present disclosure.

Only the preferred embodiments of the present invention and but a few examples of its versatility are shown and described in the present disclosure. It is to be understood that the present disclosure is capable of use in various other combinations and environments and is susceptible of changes and/or modifications within the scope of the inventive concept as expressed herein.

What is claimed is:

1. A direct oxidation fuel cell (DOFC) system, comprising:
   (a) at least one fuel cell assembly including a cathode and an anode with an electrolyte positioned therebetween, said at least one fuel cell assembly adapted for performing selected electrochemical reactions at said anode and cathode;
   (b) a source of liquid fuel in fluid communication with an inlet of said anode;
   (c) an oxidant supply in fluid communication with an inlet of said cathode;
   (d) a liquid/gas (L/G) separator in fluid communication with outlets of each of said anode and cathode for: (1) receiving unreacted fuel and liquid and gaseous products of said selected electrochemical reactions at said cathode and anode, and (2) supplying said unreacted fuel and liquid product to said inlet of said anode;
   (e) an electronic control unit (ECU) comprising a stored data table correlating the current density equivalent of the liquid fuel crossover rate with output current density; and
   (f) a control system comprising the ECU,
   wherein, the control system is programmed to determine a fuel efficiency value of said DOFC system during operation using the stored data table and programmed to determine and control the oxidant stoichiometry of said DOFC system at an appropriate value in response to the determined fuel efficiency value.

2. The DOFC system as in claim 1, wherein:
said control system is programmed to periodically or continuously determine said fuel efficiency value and utilizing same for periodically or continuously determining and controlling said oxidant stoichiometry value.

3. The DOFC system as in claim 2, wherein said control system comprises:
a sensor for measuring an output current of said DOFC system; and
wherein said ECU is programmed to for: (1) determine said fuel efficiency value based upon the measured output current; and (2) utilizing said fuel efficiency value for determining said appropriate oxidant stoichiometry value.

4. The DOFC system as in claim 3, wherein:
said control system is further adapted for utilizing said appropriate oxidant stoichiometric value for regulating/controlling a rate of supply of said oxidant to said cathode of said at least one fuel cell assembly.

5. The DOFC system as in claim 4, wherein:
said ECU comprises a programmed computer programmed to: (1) indirectly determine a current density equivalent of a liquid fuel crossover rate of said fuel cell assembly, utilizing said stored data table correlating the current density equivalent of the liquid fuel crossover rate of said fuel cell assembly with output current density of said fuel cell assembly; and (2) utilizing said indirectly determined current density equivalent of said liquid fuel crossover rate and said measured current output for determining said fuel efficiency value.

6. The DOFC system as in claim 4, wherein:
said ECU comprises a programmed computer programmed to: (1) indirectly determine a current density equivalent of a liquid fuel crossover rate of said fuel cell assembly, utilizing a stored mathematical relationship between the current density equivalent of the liquid fuel crossover rate of said fuel cell assembly and output current density of said fuel cell assembly; and (2) utilizing said indirectly determined current density equivalent of said liquid fuel crossover rate and said measured current output for determining said fuel efficiency value.

7. The DOFC system as in claim 4, wherein:
said control system further comprises a gas sensor adapted for use in directly measuring a current density equivalent of a liquid fuel crossover rate of said fuel cell assembly; and said ECU comprises a programmed computer programmed to utilize said directly measured current density equivalent of said liquid fuel crossover rate and said measured current output for determining said fuel efficiency value.

8. The DOFC system as in claim 7, wherein:
said gas sensor is positioned at said outlet of said cathode.

9. The DOFC system as in claim 8, wherein:
said gas sensor is adapted for sensing an amount of an oxidation product of said liquid fuel present at said outlet of said cathode.

10. The DOFC system as in claim 8, wherein:
said gas sensor is adapted for sensing an amount of said oxidant present at said outlet of said cathode.

11. The DOFC system as in claim 4, wherein said control system is further programmed to perform at least one of:
(1) terminating operation of said at least one fuel assembly when the determined fuel efficiency value is below a predetermined minimum value;
(2) checking for and diagnosing operating problems in said at least one fuel cell assembly;
(3) providing a signal indicating the need for corrective action to increase the determined current efficiency value to at least a predetermined minimum value; and
(4) taking corrective action to increase the determined current efficiency value to at least said predetermined minimum value.

* * * * *